June 18, 1935.  J. E. WILD ET AL  2,005,063
METHOD OF OPERATING INTERNAL COMBUSTION ENGINES
Filed March 13, 1934   3 Sheets-Sheet 1
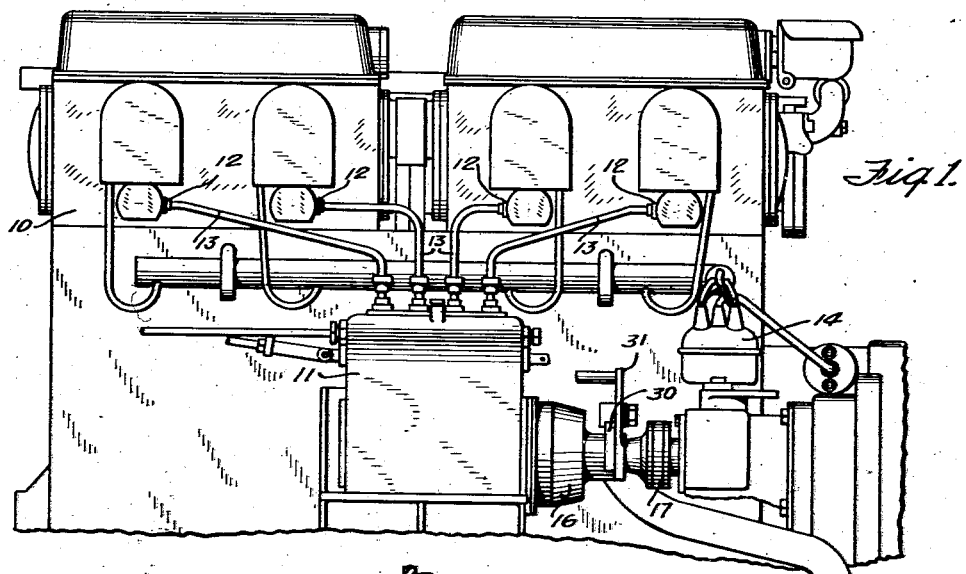
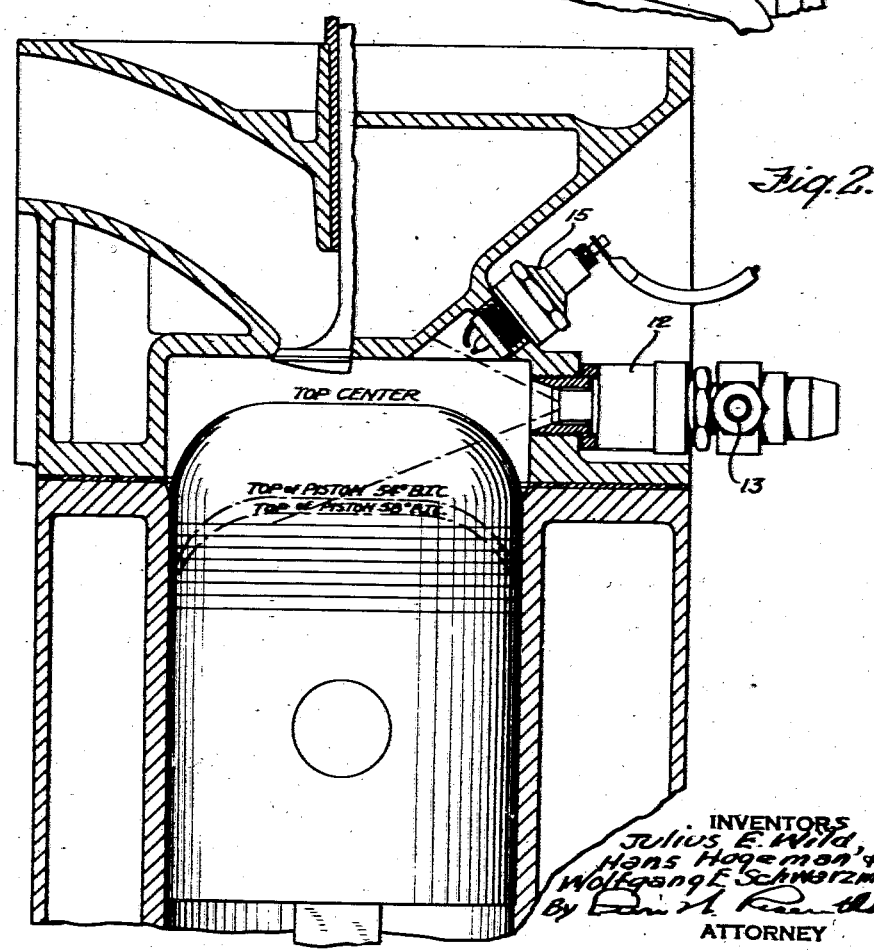
INVENTORS
Julius E. Wild,
Hans Hageman &
Wolfgang E. Schwarzman
By
ATTORNEY

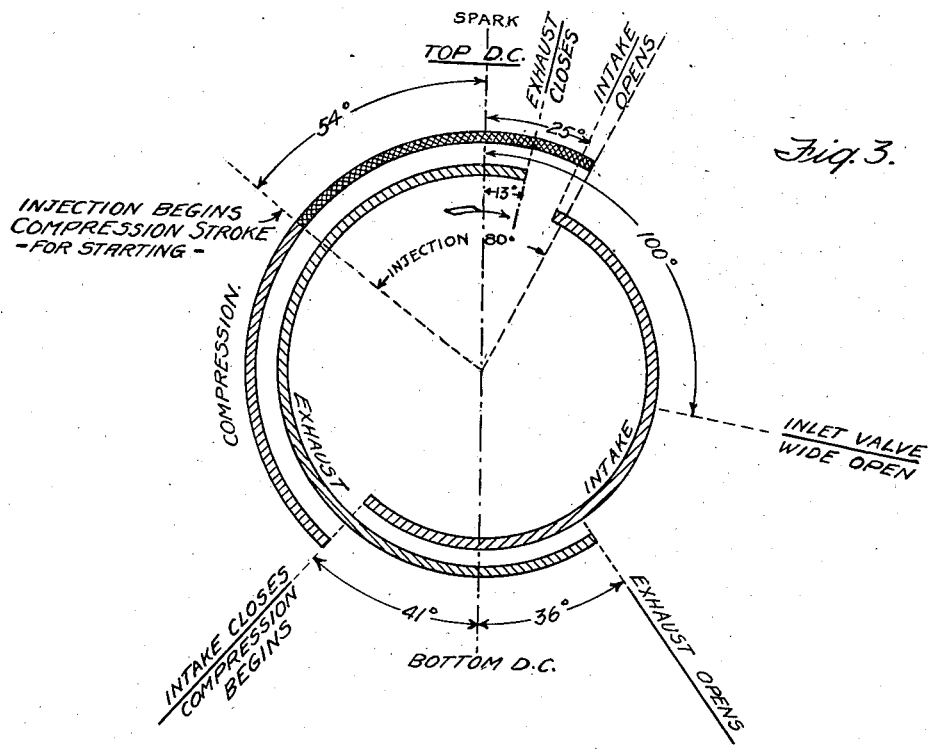
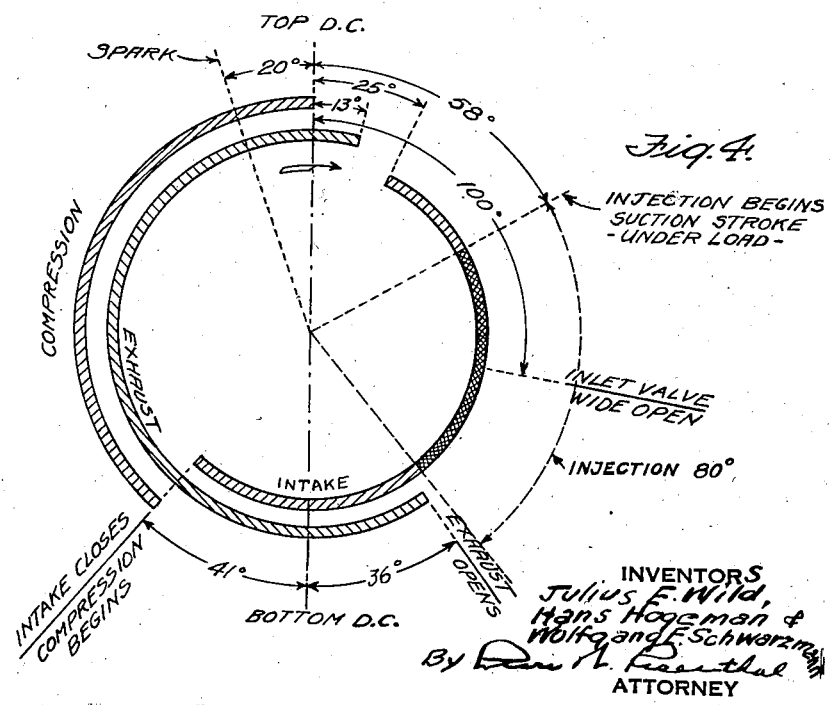

June 18, 1935.   J. E. WILD ET AL   2,005,063
METHOD OF OPERATING INTERNAL COMBUSTION ENGINES
Filed March 13, 1934   3 Sheets-Sheet 3
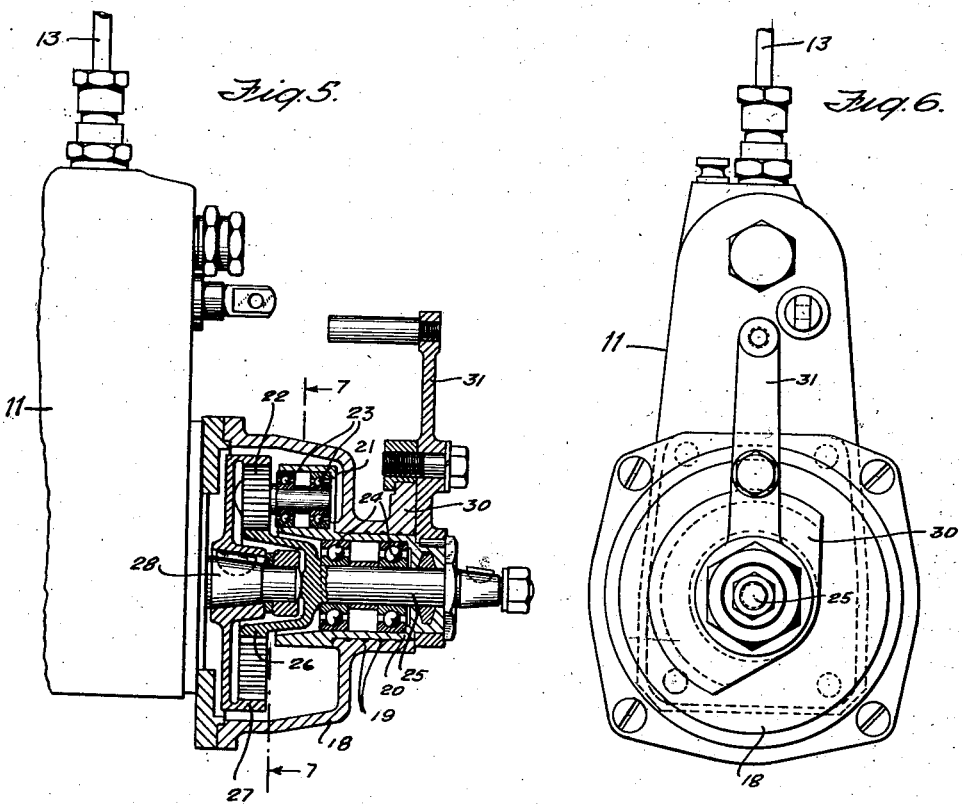
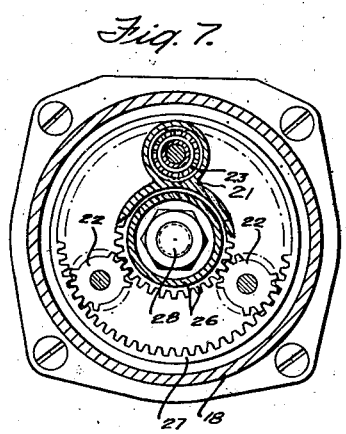
INVENTORS
Julius E. Wild
Hans Hogema
& Wolfgang E. Schwarzham
BY
ATTORNEY Patented June 18, 1935

2,005,063

UNITED STATES PATENT OFFICE 2,005,063

METHOD OF OPERATING INTERNAL COMBUSTION ENGINES

Julius E. Wild and Hans Hogeman, Springfield, and Wolfgang E. Schwarzmann, Longmeadow, Mass., assignors to United American Bosch Corporation, Springfield, Mass., a corporation of New York Application March 13, 1934, Serial No. 715,258

4 Claims. (Cl. 123—139)

This invention relates to internal combustion engines of the type in which liquid fuel is injected into the working cylinder to be mixed with the air therein, the resultant mixture being compressed and ignited by an electric spark.

It has heretofore been proposed to utilize fuels of low volatility in internal combustion engines of relatively low compression in order to obtain the advantage of reduced fire hazard as compared with that of high volatile fuels as well as to benefit by the relatively lower cost of heavy fuels. To overcome the difficulty of carbureting fuels of low volatility in conventional carbureters, it has been attempted to inject fuel directly into the engine cylinder. Where the heat of compression, or heat of compression in conjunction with that of the hot walls of the engine after same has been started, is sufficient to ignite the fuel as in the case of Diesel and semi-Diesel engines, combustion has been found to be efficient, but where high compression pressures are impracticable and spark ignition must be relied upon, both for starting and normal operation, great difficulty has been experienced in obtaining either reasonably quick starting or efficient operation under load.

Various expedients have been resorted to in order to overcome these difficulties, such for example as using a highly volatile fuel for starting. This, however, introduces the complication of two fuel supply systems and does not avoid the fire hazard of the gasoline engine.

It is the principal object of this invention to provide a method of starting engines of low-compression solid-injection spark-ignition type on low volatile fuels without the aid of auxiliary equipment for heating or otherwise preparing the fuel.

It is a further object to provide a means for carrying out the method which can be applied to known types of engines without expensive alterations, and may be quickly installed to convert various types of gasoline engines now in use to function smoothly and efficiently with fuels commonly known as safety fuels because of the difficulty of igniting them under atmospheric conditions.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:

Fig. 1 is a side elevation of an engine equipped in accordance with the present invention; Fig. 2 is a section through the upper portion of a cylinder of the engine, parts being shown in side elevation; Fig. 3 is a timing diagram disclosing the timing of injection during starting; Fig. 4 is a similar diagram of timing during normal operation; Fig. 5 is a section through a timing mechanism and a portion of a fuel pump; Fig. 6 is an end view of the timing mechanism; and Fig. 7 is a section on line 7—7 of Fig. 5.

Referring to the drawings, 10 indicates a conventional four cycle engine equipped with a fuel pump 11 supplying nozzles 12 through fuel lines 13.

The fuel pump is preferably driven from the same shaft that drives the timer distributor 14 for timing the sparks at plugs 15 which, as seen in Fig. 2, are preferably positioned above injection nozzle 12.

Between the pump and the timer distributor is a timing device 16 coupled thereto by coupling 17. While it will be understood that any suitable means capable of varying the timing of the pump through the wide range required by this invention, may be utilized for effecting the broad purposes of the method, we prefer the construction illustrated in Figs. 5, 6 and 7. This timing device comprises a housing 18 open at one end and closed at the opposite end to form an end cover. This end portion of the housing 18 also provides a bearing 19 for a sleeve 20 journaled therein. Rigidly attached to the sleeve 20 is a spider 21 carrying pinions 22 which are journaled in roller bearings 23 and retained in suitable bores within the arms of the spider 21.

Within the hollow sleeve 20 are positioned roller bearings 24 for a drive shaft 25. This drive shaft carries a gear 26 having external teeth positioned to mesh with the teeth of pinions 22. Coaxial with the drive shaft 25 is the shaft 28 of the fuel pump which carries rigidly mounted thereon a gear wheel 27 of considerably greater diameter than the gear 26 and having internal teeth adapted to mesh with the teeth of the pinions 22. The pump shaft 28 drives the fuel pump having the usual plungers.

The housing 18 also carries a segment 30, integral therewith or otherwise rigidly attached thereto, for adjustably positioning a timing lever 31. This lever 31 is operatively attached to the outer end of the sleeve 20, so that the pinions 22 carried by the spider 21 attached to the sleeve may be adjusted into any desired position about the circumference of the gear 26. The gear may be dimensioned to provide any desired increase or reduction in the speed of the pump shaft relative to the speed of the driving shaft. In the instance shown, since the drive shaft is driven at the same speed as the crank shaft, a two to one reduction is provided for a four cycle engine.

With respect to the operation of the timing mechanism, it will be observed that upon rotation of the sleeve 20 by means of the lever 31, the pinions 22 which mesh with the internal teeth of gear wheel 27 will advance or retard the pump shaft with respect to the drive shaft 1.5° for each degree through which the lever 31 is rotated.

In previous attempts to operate low compression engines on low volatile fuel, it has been proposed to preheat the fuel, but this method has not been practical for commercial purposes. Other means of preparing the fuel charge, such as the high atomization thereof by compressed air, involve complicated and expensive auxiliary equipment. We have therefore sought to solve the problem of using low volatile fuels in a manner which would not sacrifice the highly desired low fire hazard of the same by associating such fuels with other fuels of high volatility, or by introducing complicated auxiliary apparatus. In so seeking we have found that such engines could be started from a cold condition by direct injection of the low volatile fuel into the engine during the compression stroke. To obtain the best results the injection should begin at about 54° before top dead center on the compression stroke as indicated in Fig. 3, with spark ignition at top dead center. With injection beginning at this point, we have been able to start a converted four cycle gasolene engine having a compression ratio of six to one, from cold in two to six seconds at 0°. Where such an engine is warm, it can be started instantaneously with injection beginning at this point.

No load, however, can be applied to the engine when injecting into the combustion chamber during the compression stroke. For normal operation we have found that by advancing the timing of the injection to occur during the mid portion of the suction stroke, the engine will develop greater power with better fuel economy than the unmodified engine. As shown in Fig. 4, the injection now begins at about 58° after top dead center on the suction stroke. The advance shift required from starting to running position as measured on the crank shaft of the engine is 248°.

Fig. 2 indicates the preferred position of the piston within the engine cylinder during the starting period and also in dotted lines the position of the piston at the beginning of the injection when the engine is in normal operation. This figure also shows the preferred position of the injection nozzle relative to the spark plug of the engine, which, as shown, is preferably below the spark plug with the fuel spray so directed that it is closely adjacent but does not impinge directly thereon. This construction is particularly desirable where heavy fuel is atomized directly into the engine cylinder to remain therein for a material period prior to ignition. If the plug is positioned below the atomizer the long period between injection and ignition permits fuel to settle on the plug causing fouling thereof. By this arrangement there is no tendency for the atomized fuel to settle upon the spark plugs during the long period between injection and ignition during normal operation, while a relatively rich mixture adjacent the spark terminals is assured.

The timing may be varied a few degrees in either direction from that indicated, particularly in the case of injection during the suction stroke in normal operation when a few degrees more or less variation from the 58° after top dead center do not make a great difference.

It will be understood that while starting of the engine can be successfully accomplished with injection during the compression period, normal operation can not be successfully effected by injection during this period, and on the other hand while successful operation can be obtained by injection at about the period indicated during the suction stroke for normal operation, the engine cannot be successfully started with injection at this point.

We have found that when starting, a relatively short period of sufficient duration to effect some diffusion of the fuel with the air may be permitted to lapse between the injection of the fuel and the ignition thereof but this period must be of insufficient duration to permit the settling of the fuel upon the cold walls of the engine cylinder. Conditions within the combustion chamber at about 54° before top dead center on the compression stroke are apparently such that excessive contact of fuel with the walls of the engine is avoided during the short period between injection and ignition. However, there is sufficient time for preparation of a portion fuel charge to permit its ignition at top dead center. On the other hand, where the full charge is injected for normal operation during the compression stroke, there is insufficient time for its proper preparation and diffusion with the air charge to form a proper explosive mixture. Once operation has been initiated, the injection is therefore advanced to begin at about 58° after top dead center in the suction stroke. This period appears to be of vital importance for proper normal operation. A still further advance, say to correspond with the opening of the inlet valve on the suction stroke, results in faulty operation during which the spark plugs soon foul and the engine becomes inoperative. We believe that this occurs because there is insufficient turbulence in the cylinder at other parts of the suction stroke to prevent the fuel from impinging directly upon the walls of the cylinder. This would permit the fuel to collect in a liquid state upon the walls. Subsequent turbulence in the cylinder would then be of no avail in vaporizing and dispersing the fuel charge throughout the air charge. The first part of the fuel to strike the wall might be vaporized but this vaporization having absorbed the heat at the point of impingement would cause subsequent portions of the atomized fuel charge contacting the wall to wet the same and remain in a liquid condition. We therefore time the injection to occur during the mid portion of the suction stroke, when the piston is moving at high velocity and the air is entering the cylinder at high velocity, at which time there is sufficient turbulence to prevent impingement of the charge against the walls of the cylinder and such contact as occurs is no more than can be taken care of by vaporization of the liquid fuel by the heat contained in the cylinder wall, provided initial operation has already been effected by other means.

While we have described above our new method of operating an internal combustion engine and the best means for effecting said method, it will be understood that a wide variety of other means may be utilized for effecting the method. It will also be understood that certain variations may be introduced into the method of operation without departing from the scope of the appended claims and that while the time of beginning of the injection is important within the limits specified, the duration of injection will vary considerably from the 80° indicated on the timing diagram, depending upon whether the engine is running at full or light loads.

Having thus described the invention, what is claimed as new is:

1. The method of operating an internal combustion engine of the type in which fuel is injected into the working cylinder and ignited by an electric spark, which consists in injecting the fuel during the compression stroke for initial operation, and advancing said injection to occur during the suction stroke after initial operation has been effected.

2. The method of operating an internal combustion engine of the type in which fuel is injected into the working cylinder and ignited by an electric spark, which consists in injecting the fuel at about 60° before top dead center in the compression stroke and igniting at about top dead center for initial operation, and advancing said injection to commence at about 60° after dead center during the suction stroke after initial operation is effected.

3. In the method of operating an internal combustion engine of the type in which fuel is injected into the combustion space of the working cylinder to be compressed and ignited by an electric spark, the improvement which comprises injecting the fuel at not more than 60° before top dead center in the compression stroke and igniting at about top dead center, advancing the injection to begin at not less than 40° after top dead center in the suction stroke and advancing the ignition to occur at about 20° before top dead center in the compression stroke for power output.

4. The method of operating an internal combustion engine of the type in which air is drawn into the engine upon the suction stroke thereof to be mixed with separately injected fuel and the resulting mixture ignited by an electric spark, the improvement which comprises injecting the fuel during the second half of the compression stroke and igniting at about top dead center and before injection ends for initial operation, and advancing the injection to begin during the first half of the suction stroke and while the air intake is open for normal operation.

JULIUS E. WILD.
HANS HOGEMAN.
WOLFGANG E. SCHWARZMANN.